(12) United States Patent
Furlong et al.

(10) Patent No.: US 6,741,566 B1
(45) Date of Patent: May 25, 2004

(54) REMOTE MANAGEMENT ETHERNET NETWORK AND DEVICE

(75) Inventors: Darrell Furlong, Hollis, NH (US);
Brian Cole, Nashua, NH (US);
Gregory Carlson, Chelmsford, MA (US)

(73) Assignee: Metrobility Optical Systems, Inc., Merrimaok, NH (US)

( * ) Notice: Subject to any disclaimer, the term of this patent is extended or adjusted under 35 U.S.C. 154(b) by 0 days.

(21) Appl. No.: 09/566,851

(22) Filed: May 8, 2000

(51) Int. Cl.[7] .......................... G01R 31/08; H04J 3/16; H04J 3/12
(52) U.S. Cl. ..................... 370/236; 370/469; 370/522; 370/528
(58) Field of Search ................................ 370/231, 236, 370/469, 470, 476, 522, 528; 709/217, 219, 230, 330, 246

(56) References Cited

U.S. PATENT DOCUMENTS

| | | |
|---|---|---|
| 4,725,249 A | 2/1988 | Blackwood et al. |
| 4,756,695 A | 7/1988 | Lane et al. |
| 4,859,201 A | 8/1989 | Marsh |
| 5,349,644 A | 9/1994 | Massey et al. |
| 5,366,388 A | 11/1994 | Freeman et al. |
| 5,481,478 A | 1/1996 | Palmieri et al. |
| 5,562,493 A | 10/1996 | Ferrill et al. |
| 5,671,355 A | 9/1997 | Collins |
| 5,673,254 A * | 9/1997 | Crayford ..................... 370/231 |
| 6,088,369 A * | 7/2000 | Dabecki et al. ............. 370/503 |

OTHER PUBLICATIONS

Transition Networks, Remotely Managed Fast Ethernet Media Converter with Bandwidth Allocation and Loopback, Jul. 2003, pp. 1–4, Minneapolis, MN.

* cited by examiner

*Primary Examiner*—Duc Ho
(74) *Attorney, Agent, or Firm*—Maine & Asmus

(57) ABSTRACT

An Ethernet, or more generally any packetized network system, remote management device and system operable via Ethernet connections according to non-Ethernet message instructions presented during the active idle signal period, e.g. during the inter-packet gap (IPG), which are separated from the Ethernet signalling before detection. A locally managed device includes a physical layer interface adapted to receive a secondary signal which is encoded to provide a corresponding signal while conforming to the active idle and minimum IPG requirements, and is received by a remote device managed according to the encoded signals provided from the local device during the IPG. Further embodiments provide multiple (serial) nesting of such remote devices along the Ethernet path, with the instructions to and data from the most distant such remote devices forwarded through intermediate remote devices according to the present invention.

35 Claims, 7 Drawing Sheets

REMOTE MANAGEMENT ETHERNET NETWORK AND DEVICE

FIELD OF THE INVENTION

The present invention relates to remotely managed network systems, in particular to a remotely managed packet data system having control information provided during non-data gaps between the data packets.

BACKGROUND OF THE INVENTION

Prior control of remote network system devices, such as by SNMP control, have eaten into the bandwidth available for data and other network traffic. Moreover, the management and signalling protocol for such remotely-managed network devices have been excessively cumbersome, unstable or otherwise undesirable. Such protocol control of remote devices require the same high-level network operations as required for the data exchange, and may also fail to provide available network management when the system high-level network operations becomes disabled.

SUMMARY OF THE INVENTION

The apparatus and system according to the present invention provides a Wan Management channel via "quasi-inband signalling" to control remote network devices by physical layer interface devices having programmable access to the signal bits presented during the idle period which are added after packet-based network data (e.g. Ethernet) encoding and removed before network data decoding to remain transparent to normal system data transfer operation and bandwidth availability.

The system according to the present invention operates the remote devices in a stateless mode, wherein responses to received commands result in a direct remote device response, thus avoiding unstable and unpredictable system operations, especially during start-up or other transient conditions. Moreover, the added network control data signalling added does not reduce system reliability, but provides network control of enhanced reliability since the WAN management signal, being included in a data format significantly shorter than the prior network data packets, is less likely to be corrupted and thus more likely to be transferred without error.

Furthermore, the devices and system according to the present invention provide serial nesting of such remote devices along the Ethernet path, with the instructions to and data from each such remote device(s) forwarded through intermediate remote device(s) by successive receipt and retransmissions, or "hops" according to the present invention.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
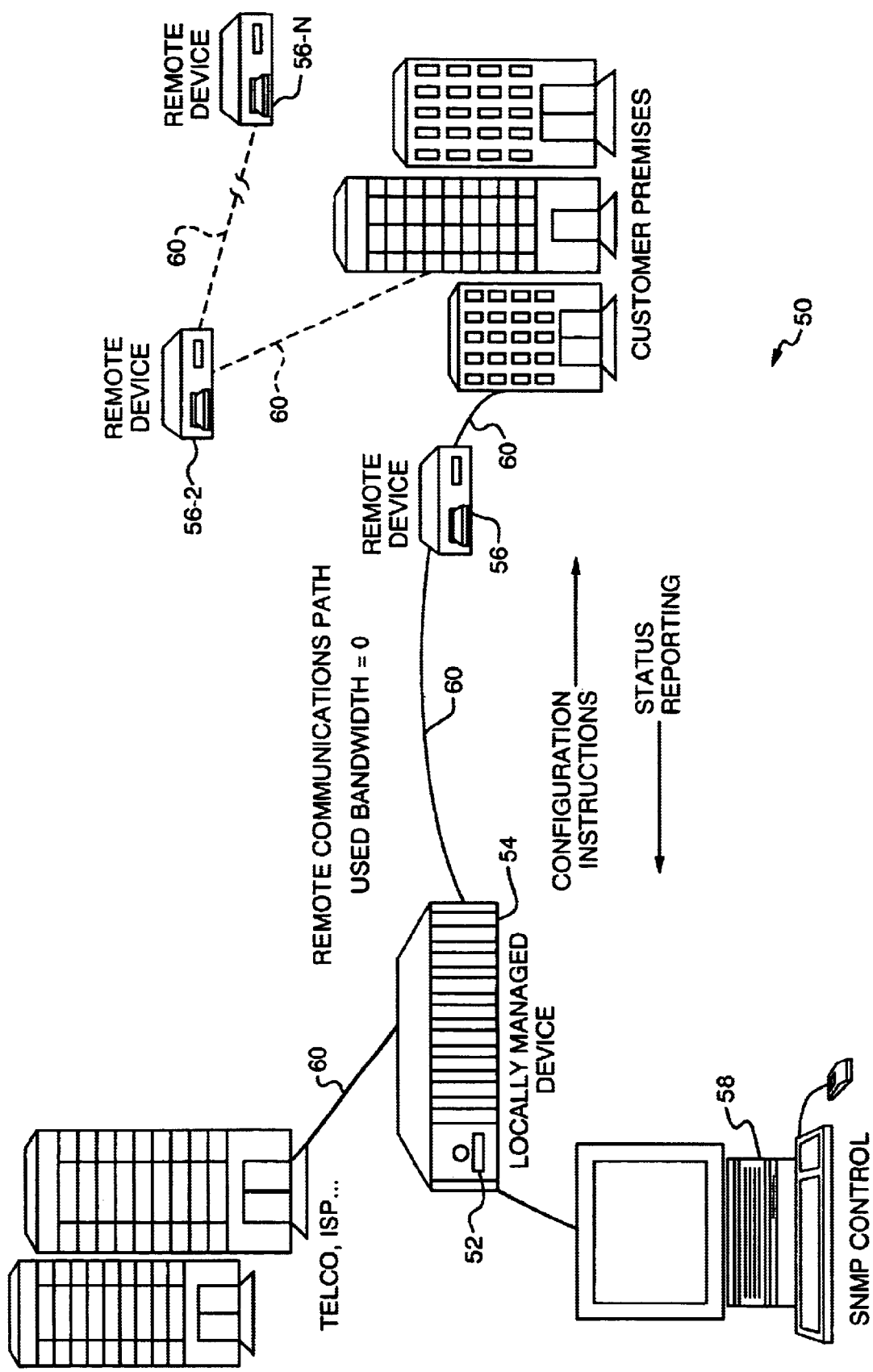
FIG. 1 is a diagram illustrating an exemplary network including one embodiment according to the present invention.

As shown in FIG. 1, the device and system 50 according to the present invention enables the network controller 52, via locally managed device 54 to reach across the network to interrogate control, status, and performance attributes of the remote network device 56. The controller 52 includes a controller CPU 53 (FIGS. 4A and 4B) and additional control, such as SNMP control via progmable system 58 or equivalent. This is accomplished via a WAN management channel that exists between and independent of the network format data packets, e.g. Ethernet. When the network management is in operation via the WAN management side channel, it will have no impact on the customers data or available bandwidth.

Figure 2:
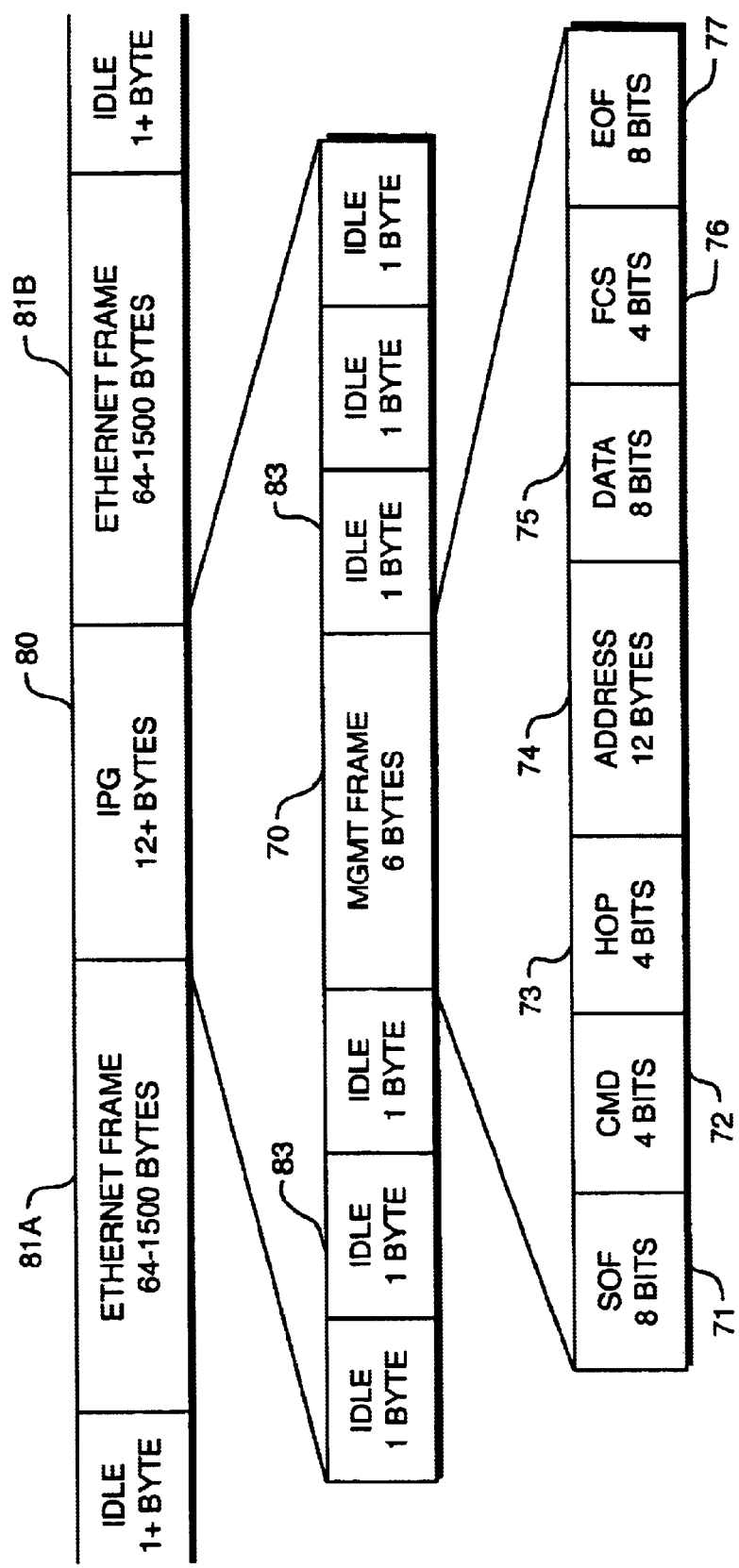
FIG. 2 is a data flow/format diagram of a network signal transfer in a network including and among devices according to one embodiment of the present invention.
Figure 4A:
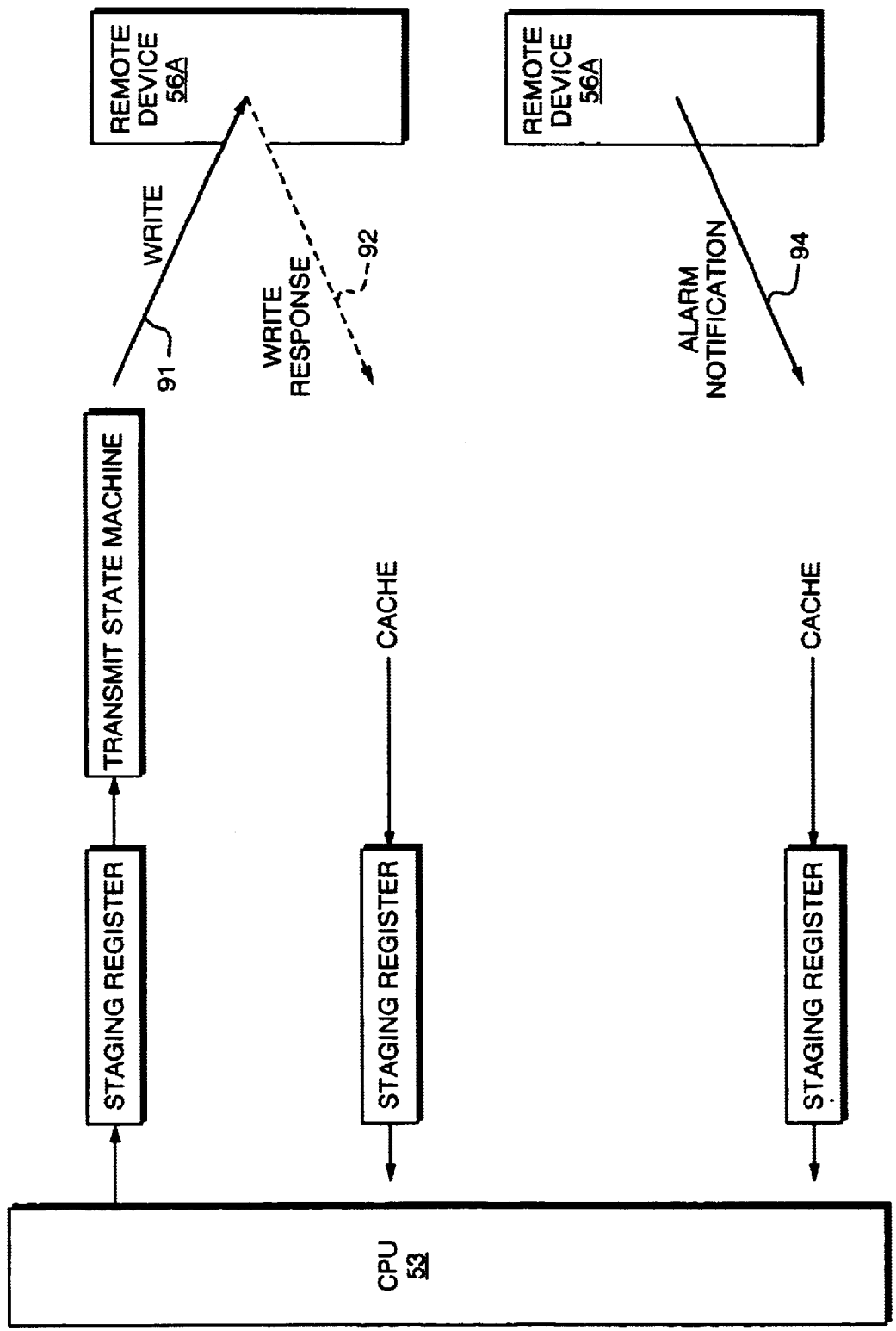
FIG. 4A and FIG. 4B are a timing diagrams showing the communication sequence between local and remote device(s) according to one embodiment of the present invention.
Figure 4B:
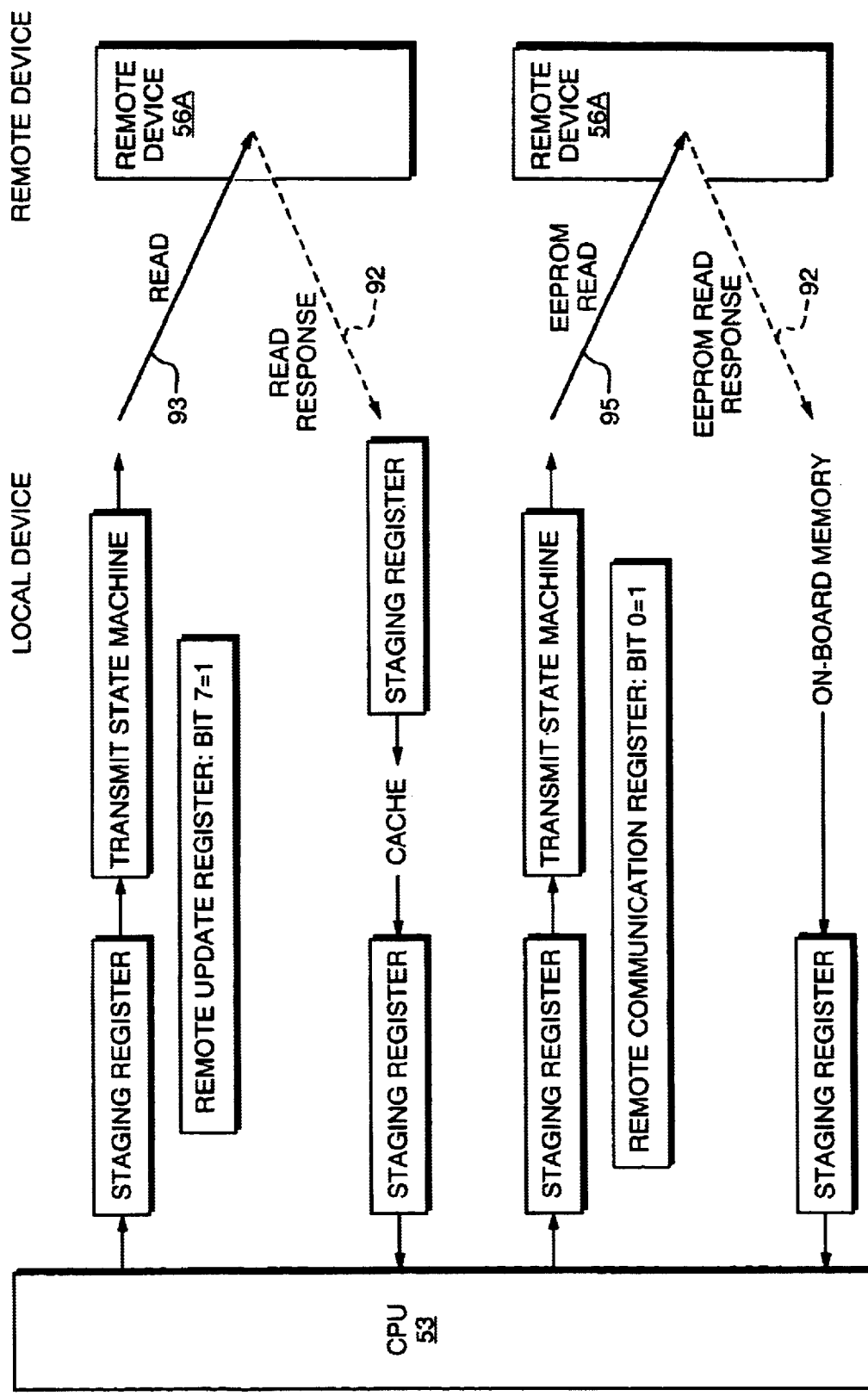

As shown in FIG. 2, the WAN management channel actually uses the Inter-Packet Gap (IPG) 80, which is the idle time between packets 81A and 81B, etc., being transmitted by end devices (not shown), and can be a transmission at any speed that is supported by the Ethernet (with active idle) or the particular data transfer protocol used. A WAN management channel packet frame 70 is generated to convey particular management data and commands between a sending device, e.g. 54, and a receiving device, e.g. 56, on the network. In one embodiment, the sending device may initially be the master, locally managed device 54 while the receiving device is the addressed remote device 56; in other embodiments or instances in the communication protocol (as shown in FIG. 4A and FIG. 4B), the reverse may be true and both combinations simultaneously may be true.

While the embodiments shown in FIG. 2 for simplicity provides direct connection between the WAN management channel packet sending and receiving devices, the present invention also is operable in networks with additional WAN management devices 56-2 . . . 56-N addressable via a 'hop' value 73 in the frame 70 specifies the number of receipts and retransmissions of the contained data to be provided for the frame. Each time the frame is retransmitted, the value of the Hop 73 number is decremented by one. The process repeats until the Hop value is zero to indicate that the receiving remote device is the final destination; thereafter, the IPG data is replaced by nominal IPG idle signals. Thus, a 4-bit Hop number can specify a maximum of 15 retransmissions, or 'hops'.

Prior to insertion into the active idle time, the active idle signals 83 in the TPG 80 a read by the sending device to verify that the IPG 80 comprises only idle 83 (non-data) bytes. The sending device then inserts the WAN management packet frame 70 (typically 6 each 8-bit bytes) into the iPG (typically initially having at least 12 idle 8-bit bytes) by replacing the corresponding idle bytes. The receiving device removes the WAN management packet bytes and reconstitutes the original IPG 80 to comprise only active idle signals, 83.

As also shown in FIG. 2, in the present exemplary embodiment, the WAN management side channel frame 70 format contains a Start of Frame delimiter byte 71, Command/Response value 72, Address value 74, Data byte 75, Frame (error) Check value 76 and End of Frame delimiter byte 77. The Address field 74 of the WAN management frame 70 will contain a value between 0 and 4096.

Upon power up, the local agent 54 will establish the presence of a remotely WAN manageable device 56 by querying the local interface for remote device information as provided on various accessible registers, described below. The local agent 54 will follow a request/response protocol as shown in FIG. 4A and FIG. 4B, with only one request typically, e.g. 91, outstanding at any specific time. After a predetermined time-out the software can issue a duplicate request or new request if no response was received. The hardware will package the request into a WAN management frame for transmission on the media between data packets, devices with WAN management must remain compatible with non-WAN management devices such as other media converters, hubs, and switches.

The local agent 54 is able to read (95) from the remote device 56 the following type of information: device serial number, model number, hardware rev, date of manufacturing, connector type, link status and all registers and counters that are accessible. Moreover, the user is able to over-ride local switch setting available on a the remote unit. The read of the remote device is provided by a local agent read command, 93 of FIG. 4B.

The WAN management channel packet is to be transmitted during the interframe idle period 80 which comprises the interpacket gap (IPG), which is specified to be a minimum of 12 bytes by the IEEE 802.3 standard in the present exemplary embodiment. To minimize and eliminate interference with user data the management packet is to be transmitted directly following a data (e.g. Ethernet) packet. If there is no Ethernet traffic to be inserted therebetween, then WAN management packet(s) (70) may be generated at any time (after the first three idle bytes) during the idle period. If user data (a non-idle byte) is received (or detected, typically by a non-match of the idle signal at the physical layer) during transmission of the management packet then the transmission of the WAN management packet is terminated (aborted) immediately to allow the Ethernet Traffic to flow through unaltered.

Example commands (72) typically include:

Read Command 93: are issued by the local agent 54 to read the contents of a location on the remote device. The Data Byte is ignored on Read Commands.

Write Command, 91: are issued by the local agent 54 to write a value to a location on the remote device. The Data Byte contains the 8-bit value being written.

Response Commands 92: are issued by the remote device 56 in response to either a Read or Write command. The Notify Response includes the register location being read and contents after any write operation has occurred.

Alarm Notification 94: are issued by the remote device in response to the contents of an alarm register changing unexpectedly. The Alarm Indication includes the register location and contents after any change has occurred.

Alarm indications are initiated and issued by remote device(s) and are sent as specific data words.

Figure 3:
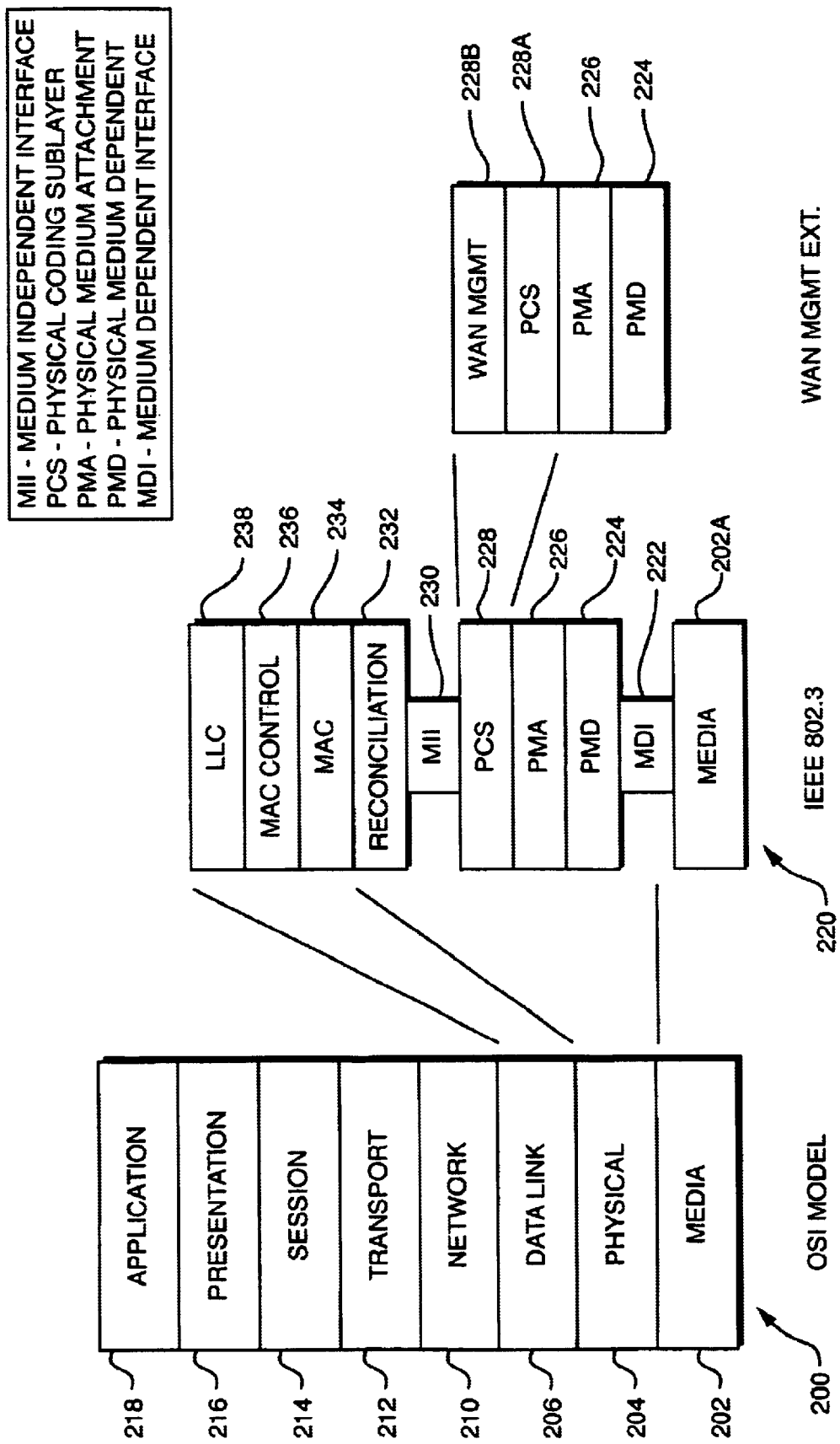
FIG. 3 is a block illustration of the signalling hierarchy including the location of WAN management signalling according to one embodiment of the present invention.

The novel and inventive features according to the present invention can be further appreciated with regard to the OSI hierarchical model 200 of packet data as shown in FIG. 3. Since the WAN management frame 70 appears between packets during the time allotted for active idle signals, the WAN management frame 70 is separated early in the model, at the physical layer 204 (as compared to earlier system management techniques which are inserted and extracted at a higher, e.g. transport 212 or session 214, layers.) The corresponding IEEE 802.3 standard model 220 provides sublayers, including a physical coding layer 228 which includes transacting (e.g. inserting or removing) the management frame 70 within the sublayer 228B. Thus, the existence of the WAN management frame 70 is invisible above OSI physical layer 204.

Figure 5:
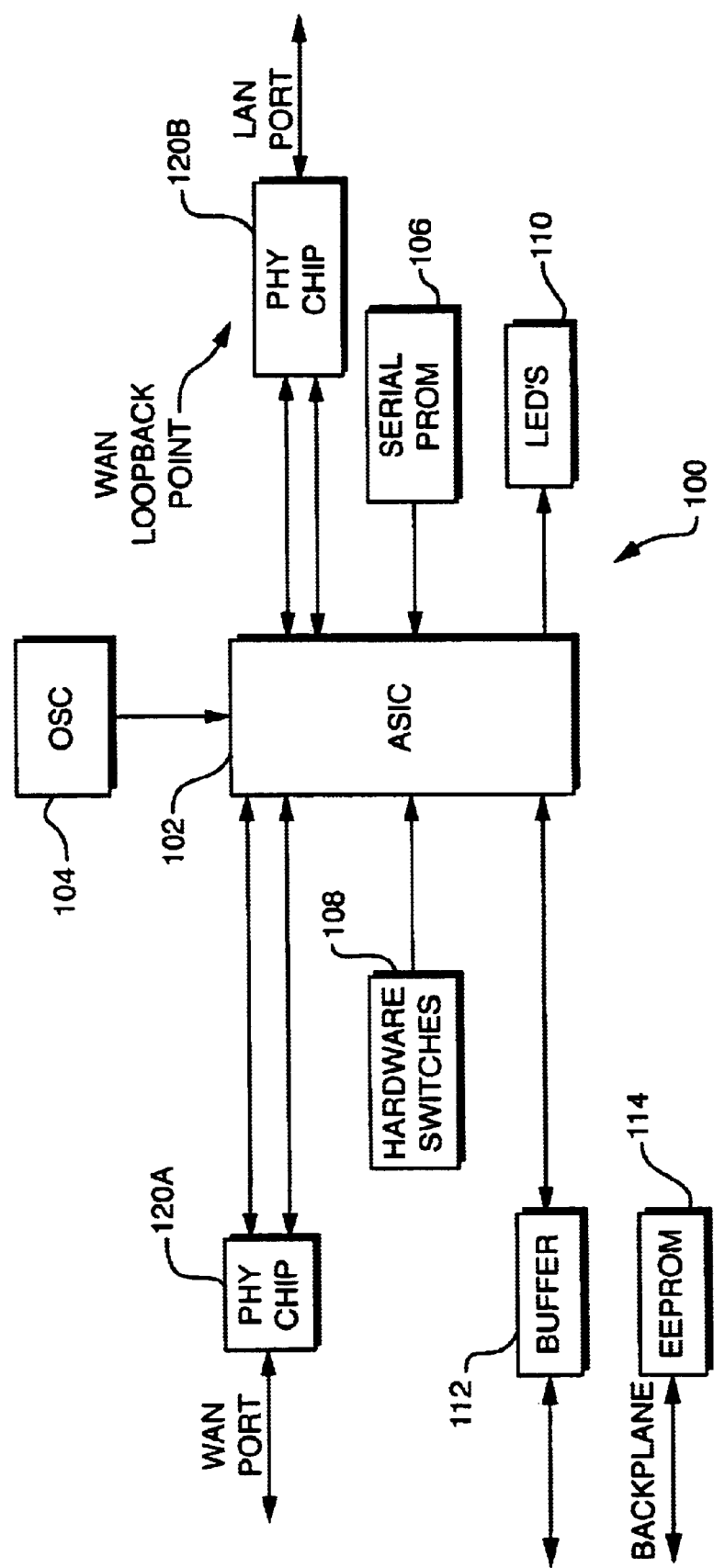
FIG. 5 is a block diagram of the board level implementation of one embodiment according to the present invention.

The board level block diagram 100 for one embodiment of the present invention local device is shown in FIG. 5, wherein an Application Specific Integrated Circuit (ASIC) 102, with the necessary clock oscillator 104, PROM 106, user option switches 108, signal LEDs 110 and controller backplane interface and data buffer 112 are connected to provide the structure and functionality according to the present invention described elsewhere. The data buffer 112 and an EEPROM 114 communicate (95) with the controller (52). The PHY (physical layer) circuits 120A and 120B communicate between WAN and LAN media, and provide the access to the idle and WAN management frame signals, e.g. during the IPG via a secondary channel as provided by typical physical layer interlace devices.

Figure 6:
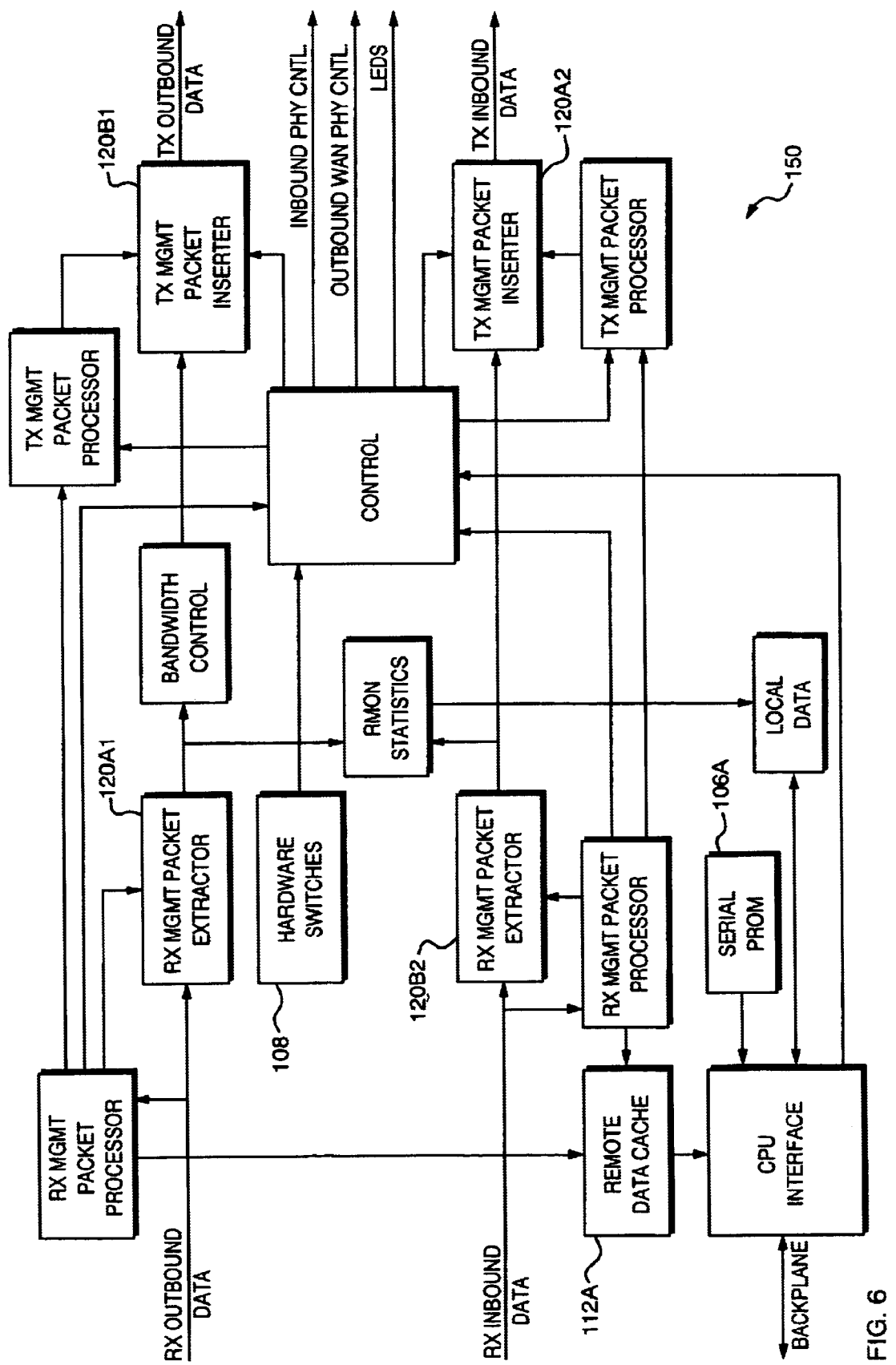
FIG. 6 is a block diagram of an ASIC according to the embodiment of the present invention of FIG. 5.

The internal structure 150 of an ASIC incorporating the features of the embodiment 100 of FIG. 5 is shown in diagram 150 of FIG. 6.

The number of bits comprising the constituent bytes and/or words of the frame 70 may also include greater and lesser values. Moreover, the specific implementation of the structure according to the present invention as illustrated by the exemplary configurations of FIGS. 1–6 incorporates the technology available to one of ordinary skill in the art, as well as their equivalents and future improvements which may provide apparatus operable according to the present claimed invention. For instance, other structural implementation of adding signalling at the physical or MAC layer of the sending device and recovering (and optionally removing) signalling in the sending device at the physical or MAC layer is within the scope of the present invention. Moreover, the network media is not limited to twisted pair (TP), fiber-optic, coaxial cable, etc., and includes any media, including wireless, by which the network may be configured and made operable according to the present invention with appropriate PHY elements 120A and 120B. Further modifications and substitutions by one of ordinary skill in the art and according to the present invention are within the scope of the present invention, which is not to be limited except by the claims which follow.

What is claimed is:

1. A network, comprising:
   a first equipment interface for connecting to a selected medium, including a first media physical connection layer adapted to provide a first format data transfer having periods of data transfer and intervening periods of non-data signalling, and a second format data transfer during said first format data transfer non-data signalling; and
   a first remote equipment interface connected to said medium to receive said first and second format data transfer and adapted to provide first and second data output therefrom, and including a second format data decoder for providing a response to said received second format data.

2. The network according to claim 1, wherein said first remote equipment interface further includes a second data transmitter wherein said response comprises transmission of selected second format data to additional equipment interfaces connected to said medium.

3. The network according to claim 2, wherein at least one of said first equipment interface and said first remote equipment interface includes at least one of means for inserting data below the MAC layer of the OSI model and means for recovering data below the MAC layer of the OSI model.

4. The network according to claim 2, further comprising an additional remote equipment interface connected to said medium to receive said selected second format data from said first remote equipment.

5. The network according to claim 4, wherein said second data format further includes a forwarding hop signal corresponding to the number among a plurality of connected additional equipment interfaces that data is forwarded by at least one transmission.

6. The network according to claim 5, wherein said plurality of additional equipment interfaces are serially connected along said medium.

7. The network according to claim 1, further including remote equipment connected to said first remote equipment interface, wherein said first remote equipment interface initiates information transfer between said remote equipment and said first equipment interface.

8. The network according to claim 1, further including first equipment connected to said first equipment interface to receive and send information to said first remote equipment interface.

9. The network according to claim 8, wherein said first equipment includes a programmable data device.

10. The network according to claim 8, wherein
said first remote equipment interface includes at least one of remote equipment monitoring devices and network monitoring devices,
said first equipment includes a network control system responsive to said at least one of remote equipment and network monitoring device.

11. The network according to claim 10, wherein
said first remote equipment interface includes a remote equipment control device responsive to a signal sent from said network control system.

12. The network according to claim 1, wherein said first remote equipment interface includes means for recovering said second format data transfer and replacing said second format data with non-data signalling.

13. The network according to claim 1, wherein said first format data complies with IEEE 802.3 standard, and said non-data signalling and said second format data comply with the inter-packet gap requirements of said IEEE802.3 standard.

14. The network according to claim 1, wherein at least one of said first equipment interface and said first remote equipment interface includes a signal detector, which removes said second format signal.

15. The network according to claim 1, wherein said second format data comprises a start-of-frame, an end-of-frame, and address and data signals within a sequence of contiguous bytes.

16. The network according to claim 15, wherein said second format data further comprises command, hop, and frame check signals.

17. The network according to claim 1, wherein said second format data comprises hop value that specifies a number of retransmissions of said second format data to a number of remote devices prior to removal of said second format data.

18. The network according to claim 1, wherein said second format data comprises a stateless protocol, said first remote equipment interface having a single state of operation.

19. The network according to claim 1, wherein said second format data further includes at least one of a command and an error code signal.

20. A signalling receiver for receiving a first format data and a second format data, said first format data including an idle data signal between packets of data, wherein said second format data comprises data signals sent within said idle data signal between packets of first format data, said signalling receiver includes a first format data transmitter for retransmitting said first format data and for transmitting signals other than the received second signals within said second format data.

21. The signalling receiver according to claim 20, wherein said signalling receiver includes at least one of means for inserting data below the MAC layer of the OSI model and means for recovering data below the MAC layer of the OSI model.

22. The signalling receiver of claim 21 further includes means for transmitting at least one of an alarm signal and a data signal within said second format data.

23. A method of network signalling, comprising:
signalling between a first equipment medium interface and a second equipment medium interface according to a first format, said first format having data sent in contiguous data packets with gaps having first format idle signalling therein; and
signalling between said first equipment medium interface and said second equipment medium interface during said first format idle signalling according to a second format which conforms to said first format idle signalling; and
separating signals corresponding to said first format from said second format in said second equipment medium interface.

24. The method according to claim 23, further comprising replacing the second format signal in at least one gap of said gaps with first format idle signals.

25. The method according to claim 23, further including retransmitting at said second equipment medium interface second format signals to a third equipment interface.

26. The method of claim 23, wherein the signalling between said first equipment medium interface and said second equipment medium interface during said first format idle signalling includes requesting information, said method further comprising:
signalling between said second equipment medium interface and said first equipment medium interface during said first format idle signalling in response to said requesting information.

27. The method of claim 26, wherein said signalling between said second equipment medium interface and said first equipment medium interface during said first format idle signalling in response to said requesting information comprises providing second equipment medium interface data to said first equipment medium interface.

28. The method of claim 23, further comprising:
hanging the configuration of said second equipment medium interface in response to said signalling between said first equipment medium interface and said second equipment medium interface during said first format idle signalling.

29. A system for carrying out Ethernet remote management over a network without using packet data bandwidth, comprising:
a first media physical connection device adapted to provide data packets with inter-packet gaps therebetween; and a processor adapted for replacing idle data normally included in the inter-packet gaps with management data intended for one or more remote network devices, thereby providing an in-band management channel for carrying out remote device management.

30. The system of claim 29, wherein the first media physical connection device is further adapted to receive remotely transmitted data packets with inter-packet gaps therebetween, and the processor is further adapted to replace management data received in the inter-packet gaps with idle data.

31. The system of claim 29, wherein the system enables communication between first and second media, the system further comprising:

a second media physical connection device in communication with the first media physical connection device, and adapted to provide second media data packets with inter-packet gaps therebetween.

32. The system of claim 31, further comprising:

a second processor adapted for replacing idle data normally included in the inter-packet gaps between the second media data packets with management data, thereby providing access to a second media in-hand management channel for carrying out management of one or more remote devices associated with the second media.

33. The system of claim 31, wherein at least one of the first and second media physical connection devices provides a loopback point to remote devices.

34. The system of claim 31, wherein the second media physical connection device is further adapted to receive from the second media remotely transmitted data packets with inter-packet gaps therebetween, and the second processor is further adapted to replace management data received in the inter-packet gaps with idle data.

35. The system of claim 29, wherein the data packets and inter-packet gaps therebetween comply with IEEE 802.3 standards, whether carrying user data, idle data, or management data.

* * * * *

UNITED STATES PATENT AND TRADEMARK OFFICE
CERTIFICATE OF CORRECTION

PATENT NO. : 6,741,566 B1
DATED : May 25, 2004
INVENTOR(S) : Darrell Furlong, Brian Cole and Gregory Carlson It is certified that error appears in the above-identified patent and that said Letters Patent is hereby corrected as shown below:

<u>Title page,</u>
Item [73], Assignee, delete "Merrimaok", insert -- Merrimack --.

<u>Column 6,</u>
Line 57, delete "hanging", insert -- changing --.

Signed and Sealed this

Twenty-fifth Day of October, 2005

JON W. DUDAS
*Director of the United States Patent and Trademark Office*